Sept. 1, 1942.　　　C. LANGBERG ET AL　　　2,294,622
CAMERA AND PROJECTOR APPARATUS
Filed Aug. 16, 1939　　　2 Sheets-Sheet 1
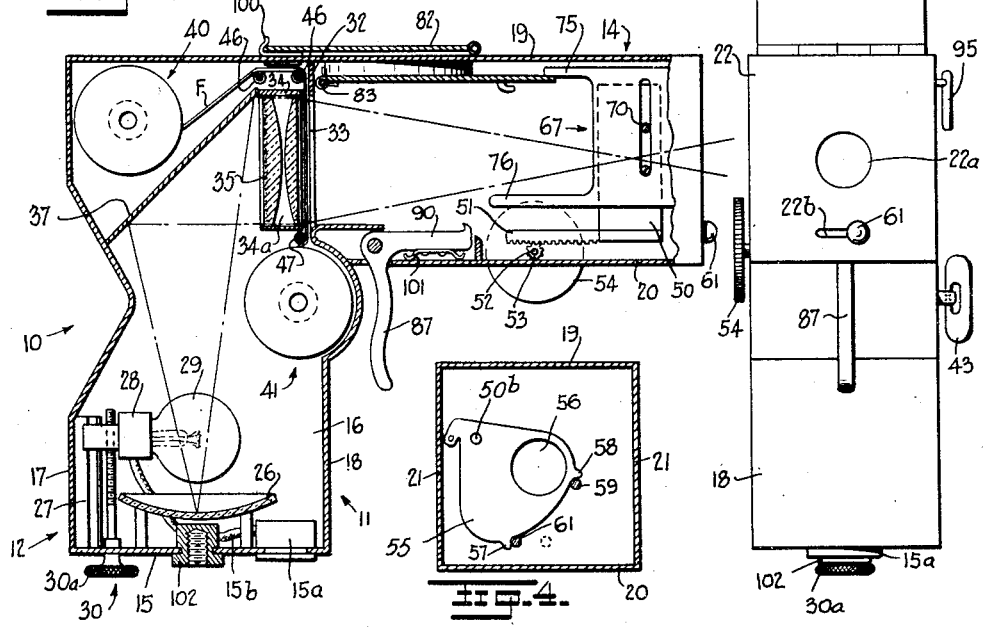
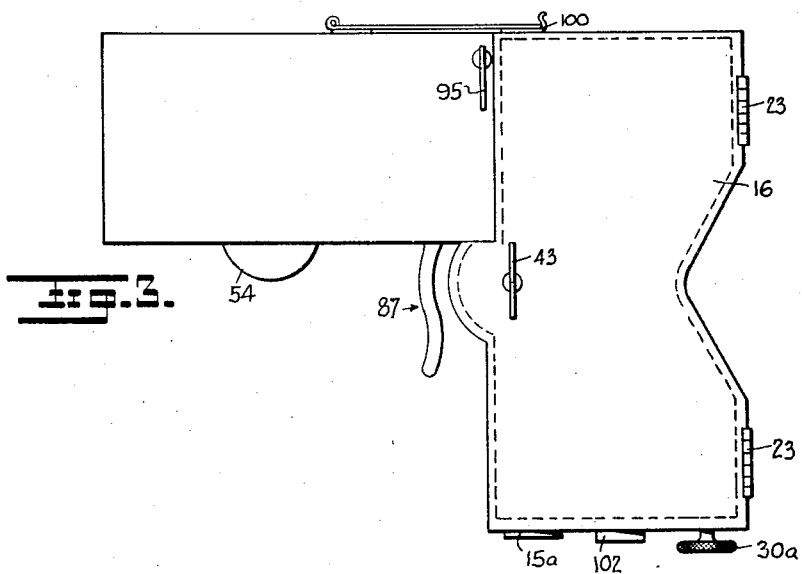
INVENTORS.
CHARLES LANGBERG.
GEORGI A. FFOULKES.
BY Carl Miller
ATTORNEY.

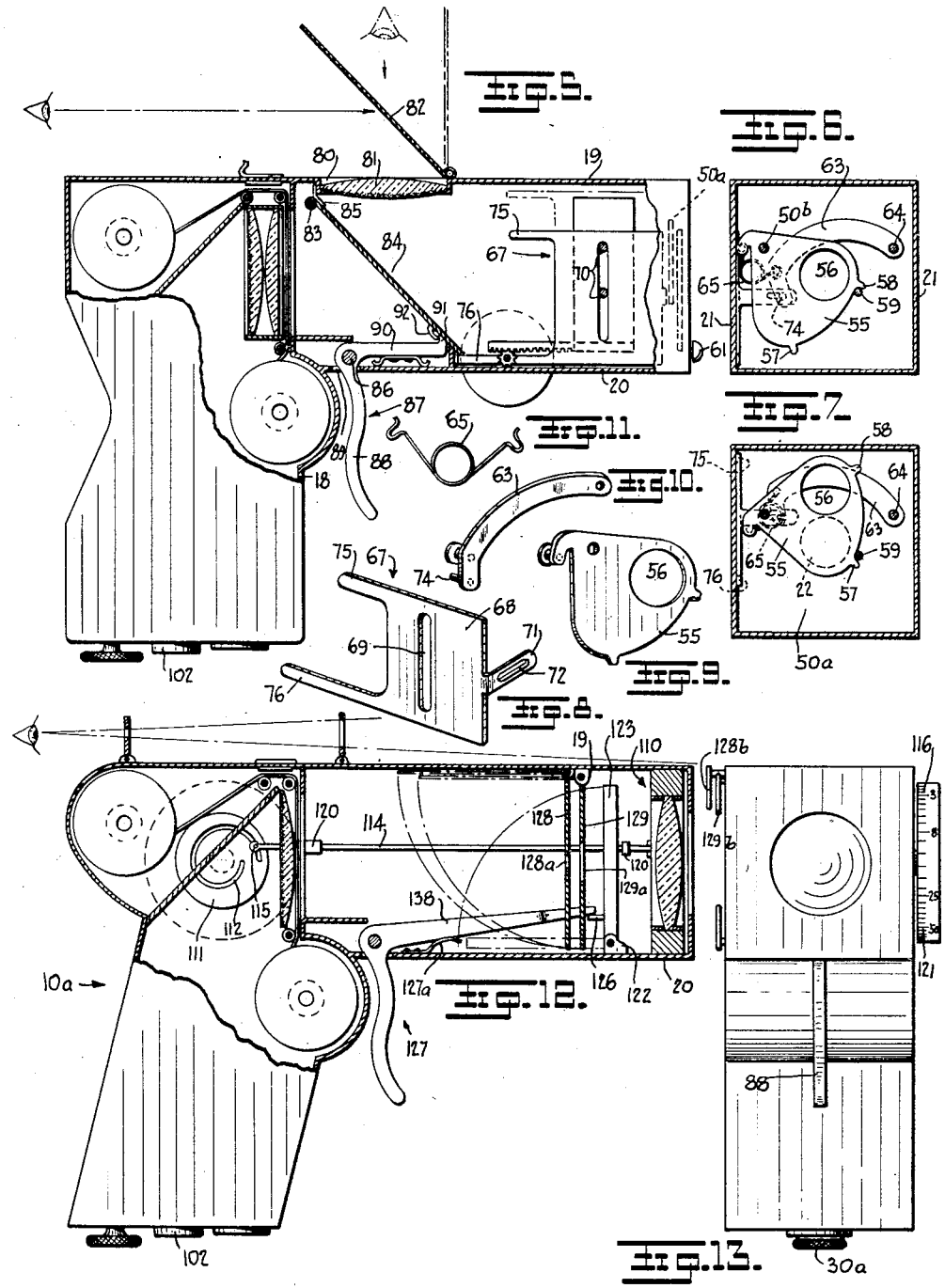

Patented Sept. 1, 1942

2,294,622

UNITED STATES PATENT OFFICE 2,294,622

CAMERA AND PROJECTOR APPARATUS

Charles Langberg and Georgi A. Ffoulkes,
New York, N. Y.

Application August 16, 1939, Serial No. 290,439

9 Claims. (Cl. 88—28)

This invention relates to a photographic camera and projector combination which is so constructed as to permit of the use of the apparatus for picture taking and also for projection and for enlarging of pictures by the projection process.

An object of this invention is to provide an article of the character described which may be held in one hand and which is provided with focusing means readily adjustable by a finger of the hand which is holding the camera.

Another object of this invention is to provide an article of the character described having the general shape of a pistol and provided with a handle portion housing a light source as well as the film reels.

A further object of this invention is to provide in a camera of the character described a mirror releasably held in the path of the light rays between the shutter and the film to obstruct the rays so that the film will not be exposed while the shutter is open, said mirror serving to reflect the image of the object to be photographed, so that said image may be viewed by the operator prior to exposing the film, and said camera having means to release the mirror and also means to move the mirror out of the path of the light rays to gradually expose the film, and also includes means to close the shutter after the mirror has been fully moved out of the path of the light rays, to terminate the exposure of the films, whereby both the movement of the mirror and the movement of the shutter control the exposure of the film.

A still further object of this invention is to provide in an article of the character described, a shutter and means to retain the shutter in open position when said article is used as an enlarger.

Still another object of this invention is to provide in an article of the character described, novel and improved means to permit viewing the object to be photographed from various positions.

A further object of this invention is to provide in an article of the character described, a plurality of discs having apertures of various sizes and located in front of the shutter mechanism, said discs being selectively movable away from in front of the shutter mechanism whereby to regulate the size of the shutter opening.

Yet another object of this invention is to provide in a device of the character described, shutter mechanism normally in the path of light rays passing from the focusing lens to the film when said article is used as a camera, and movable out of said path to permit the device to be used as an enlarger or projector.

A still further object of this invention is to provide a compact and durable device of the character described which will be relatively inexpensive to manufacture, easy to operate with one hand, and to transform from enlarger or projector to a camera, and which shall be easy to operate, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Figure 1 is an elevational cross-sectional view of an article embodying the invention while functioning as an enlarger or projector;

Figure 2 is a front end view of the article shown in Figure 1, with the top reflecting mirror in raised position;

Figure 3 is a side elevational view of the article shown in Figure 1 from the opposite side of said article;

Figure 4 is a transverse cross-sectional view of the shutter plate maintained in open position when the article is used as an enlarger or projector;

Figure 5 is an elevational cross-sectional view of the article embodying the invention when functioning as a camera and showing the position of the partition prior to pulling the trigger for operating the shutter mechanism and exposing the film;

Figure 6 is a transverse cross-sectional view of the shutter mechanism showing the parts when the shutter is open;

Figure 7 is a view similar to Figure 6 but showing the shutter mechanism with the shutter plate at closed position;

Figure 8 is a perspective view of the shutter operating member;

Figure 9 is a perspective view of the shutter plate;

Figure 10 is a perspective view of the shutter arm;

Figure 11 is a side view of the torsion spring which interconnects the shutter plate with the shutter arm;

Figure 12 is an elevational, cross-section of the article embodying the invention and illustrating a modified construction, and Figure 13 is a front end elevational view of the device shown in Figure 12.

Referring now in detail to the drawings and particularly to Figures 1-11, inclusive, 10 designates a combination camera, enlarging device and projector embodying the invention. The same comprises a housing 11 generally in the shape of a pistol and having a downwardly extending rear handle portion 12 and a forwardly extending muzzle portion 14 at the upper end of said handle portion.

The handle portion 12 has a bottom wall 15, side walls 16, a rear wall 17 and a front wall 18. The muzzle portion 14 of the housing has a top wall 19 which also constitutes the top wall of the handle portion 12, a bottom wall 20, side walls 21 aligned with the side walls 16 of the handle portion 12, and a front wall 22. Said front wall 22 is formed with a central aperture 22a and with a horizontal slot 22b disposed below said aperture. One side wall 16 of the handle portion 12 may be in the form of a door hinged to the rear wall 17 on vertical hinges 23.

Mounted on the bottom wall 15 is a concave reflector 26 adapted to reflect light upwardly. Within the handle portion 12 of the housing is a vertical guide 27 on which is slidably mounted a lamp socket 28 carrying a lamp 29 disposed directly above the reflector 26. Rotatably and non-slidably mounted on the bottom wall 15 is a vertical screw 30 having threaded engagement with the socket 28 and provided with a finger wheel 30a below wall 15, whereby to regulate the position of the lamp 29 for the purpose hereinafter appearing.

Disposed within the housing 11 between the handle portion 12 and the muzzle portion 14 thereof is a vertical plate 32 formed with an opening 33. Mounted within the handle portion 12 of the housing is a lens holder 34 located in back of the opening 33 and carrying condenser lenses 34a, the rear one of which is frosted as at 35. Within the handle portion of the housing is also a mirror 37 inclined forwardly and upwardly and adapted to reflect light rays from the reflector 26 forwardly through the condenser lenses 34 and through the opening 33 of wall 32. To this end the mirror 37 is located in back of the condenser lenses and above the reflector 26.

Within the handle portion of the housing and above the reflector mirror 37 is rotatably mounted a film roller 40. There is further rotatably mounted within the handle portion of the housing a second film roller 41 located below the lens carrier 34. Above the lens carrier 34 are a pair of parallel horizontal guide rollers 46 and below the said lens carrier is a guide roller 47. The film F unwinds from the roller 40, passes over the guide rollers 46 and then downwardly between the condenser lens 34a and wall 32 and around the guide roller 47, the film again being wound onto the roller 47. It will now be understood that when the article 10 is used as an enlarger or projector, light rays passing upwardly from the concave reflector 26 will be reflected by inclined mirror 37 forwardly through the condenser lenses 34a and through the portion of the film F which is disposed between said condenser lenses and the opening 33 in the wall 32. Said light rays pass through the aperture 22a of the front wall 22.

Mounted on the bottom wall 15 of housing portion 11 is an electric socket 15a adapted to receive the plug blades of an electric cord connector. Said socket 15a is connected by wiring 15b to the socket 28 whereby to provide current for the lamp 29 when the article 10 is to be used as an enlarger or projector. The reel 41 is provided with a handle 43 located on the outside of the housing so that the film F may be advanced by the operator.

At the front of housing portion 14 is a focusing lens holder 50 to which there is fixed a rearwardly extending rack 51. The holder 50 is slidably mounted for movement forwardly or rearwardly toward or away from the front wall 22. Rotatably mounted on a side wall 21 of housing portion 14 is a pinion 52 meshing with the teeth of rack 51. The pinion 52 is carried on a shaft 53 to which there is fixed a wheel 54 located at one side of the housing portion 14 and projecting beneath said housing portion so that the operator holding the article 10 in one hand may rotate the wheel 54 with a finger of the same hand that holds said article, to advance or retract the said holder 50.

Between holder 50 and wall 22 is shutter mechanism 50a comprising a fixed pivot pin 50b on which is pivoted a shutter plate 55 having an eccentric opening 56 adapted to register with the opening 22a when said plate is swung downwardly as shown in Figures 4 and 6 of the drawing. On shutter plate 55 are a pair of spaced projections or fingers 57 and 58 serving as stops adapted to contact a fixed pin 59 within the camera casing, to limit the angular movement of the shutter plate 55. When the shutter plate moves downwardly stop 58 contacts pin 59 to hold said plate in open shutter position. When the shutter plate 55 is swung upwardly to the position shown in Figure 7 of the drawings stop 57 engages said fixed pin 59.

Slidably mounted on a front wall of the housing and extending through the horizontal slot 22b is a member 61 adapted to be moved to the left, to the position shown in Figure 4 of the drawings, into engagement with the stop finger 57, to hold the stop finger 58 in engagement with the fixed pin 59, whereby to retain the shutter in open position when the article 10 is used as an enlarger or projector. The camera shutter mechanism may be of ordinary construction and further comprises a shutter arm 63 pivoted within the casing on a pivot pin 64. The shutter arm 63 is interconnected to shutter plate 55 by a torsion spring 65. When the article is used as a camera the shutter arm 63 is swung upwardly and downwardly about the pivot pin 64, in a manner hereinafter described, to open or close the shutter.

Means are provided to operate the shutter when the article 10 is used as a camera. To this end there is slidably mounted within the housing portion 14 of the camera, for vertical up and down movement, a shutter control member 67 comprising a plate 68 disposed parallel to a side wall 21 of housing portion 14. Plate 68 is formed with a vertical slot 69 through which there extends a pair of fixed guide pins 70. Extending at right angles to plate 68 is an arm 71 formed with a slot 72. On shutter arm 63 is a pin 74 passing through the slot 72 for the purpose hereinafter appearing. Extending rearwardly from the plate 68 is an upper finger 75 and a lower finger 76 for the purpose hereinafter appearing. It will now be understood that when the control member 67 is in its down position the arm 63 is held downwardly to open the shutter plate 55 and maintain the same in position shown in Figure 6 of the drawings. As said member 67 is moved upwardly in the manner hereinafter appearing, shutter arm 63 is swung upwardly to snap the shutter plate 55 to the closed position shown in Figure 7 of the drawings.

For the purpose hereinafter appearing the top wall 19 of the housing 11 is formed with an opening 80 disposed forwardly of the lens carrier 34. Within opening 80 is a lens 81 preferably frosted on one surface. Pivoted to said top wall 19 forwardly of lens 81 is a mirror 82 which may be moved to rearwardly and upwardly inclined position shown in Figure 5 of the drawings. Said mirror 82 may be swung to vertical position as shown by dot-dash lines in Figure 5 so that a person may look downwardly directly through the lens 81.

Hinged as at 83 to the inside of wall 19 rearwardly of lens 81 is a forwardly extending mirror 84 normally urged upwardly by a hinge spring 85, in the well known manner. The upper surface of the mirror 84 is the reflecting surface thereof. Means are provided to maintain the mirror 84 in a forwardly and downwardly inclined position as shown in Figure 5 of the drawings, so that the image of the object to be photographed may be viewed by looking at the mirror 82 in a horizontal position, or by looking directly downwardly through the lens 81 when said mirror is swung to vertical position. To this end there is pivoted within the camera on a pivot pin 86 located just above the bottom wall 20 and adjacent the front wall 18 of the handle portion of the housing, a trigger member 87 in the form of a bell crank lever having a downwardly extending arm 88 projecting through an opening 89 in the bottom wall 20. Extending forwardly from arm 88 is an arm 90 having a hook portion 91 adapted to engage a hook 92 on the back of mirror 84, to retain said mirror in a position shown in Figure 5 of the drawings. In such position light rays passing through the open shutter will strike the mirror 84 and be reflected upwardly through the lens 81 and also reflected on the mirror 82 rearwardly to the eyes of the person framing the camera on the object to be photographed. On hinge 83 of the mirror 84 is a handle 95 located outside of the casing, to rotate the mirror 84 downwardly into engagement with the hook 91 of the trigger 87. When the mirror 84 is in a position as shown in Figure 5 it engages finger 76 of control member 67, to maintain the shutter in open position, as explained hereinbefore. When the trigger is pulled the mirror 84 will be released and the torsion spring 85 will swing said mirror upwardly to the position shown in Figure 1 of the drawings. As the mirror swings upwardly it engages the finger 75 to raise control member 67 to close the shutter. Thus after the camera is focused, the operator pulls the trigger to expose the film and close the shutter. It will be noted that the shutter plate 55 does not begin to close until the mirror 84 has moved the control member 67 to its uppermost position. As the mirror 84 moves upwardly, the exposure of the film and the amount of light passing to the film increases gradually, since more light passes to the film as the mirror moves upwardly.

It will be furthermore noted that the film is exposed from its lower end to the upper end as the outer edge of the mirror 84 moves upwardly. When the mirror has moved, the control member 67 to its uppermost position, the shutter plate 55 moves from the open position shown in Figure 6 to the closed position shown in Figure 7, and the shutter opening is closed gradually to gradually decrease the amount of light passing to the film; and the closure of the shutter opening is from its lower end to the upper end, thus insuring a uniform exposure of all parts of the film.

Thus, the proper exposure of the film depends upon the operation of both the metal mirror and the shutter plate. The shutter operating spring 65 as well as the shutter plate 55 and the mirror 84 and its operating spring 85 are so designed as to strength and weight that the time required to fully move the mirror from the position shown in Figure 5 to the position shown in Figure 1, is equal to the time required to move the shutter plate 55 from the open position shown in Figure 6 to the closed position shown in Figure 7, so that it takes just as long to increase the light to the film from zero to maximum, as it takes to decrease the light to the film from maximum to zero.

When the mirror swings downwardly by operating the handle 95, the control member 67 is lowered but the shutter does not snap open until the mirror 84 is engaged by the trigger, to make sure that the shutter does not open until the film is wholly obstructed by the mirror.

After the film is exposed the handle 43 is turned to advance the film to bring an unexposed portion thereof into alignment with the shutter opening. The handle 95 may then be swung downwardly to lower the mirror 84 for simultaneously intercepting the light rays to the film and opening the shutter. The camera is then in position for taking another picture.

When the article 10 is used as a camera, member 61 is moved to the position shown in Figure 2 of the drawings, out of engagement with the shutter plate. Furthermore the electric cord connector may be removed from the socket 15a so that the lamp 29 will not be illuminated.

When the article is used as an enlarger or projector, mirror 82 is swung downwardly to the position shown in Figure 1 and is held in such position by a spring clip 100. Furthermore, the mirror 84 should be in horizontal position as shown in Figure 1 of the drawings, being retained in such position by the spring 85. Attached to the under side of the arm 90 of the trigger 87 is a spring 101 adapted to normally raise said arm 90 so that the hook 91 will snap into engagement with the hook 92 when the mirror 84 is rotated downwardly.

On the bottom wall 15 is an internally screw threaded member 102 whereby the camera may be mounted on a tripod.

Before the trigger 87 is pulled to expose the film, a color filter is placed in any suitable position to intercept the rays passing through the lens 81. Said filter is preferably of a color to which the film F is not sensitive, so that the film will not be effected by any rays passing through the lens 81 during exposure, and nevertheless the object can be viewed to the last moment prior to exposure. If desired, however, the mirror 82 may be swung downwardly to cover the lens 81 just prior to pulling the trigger 87.

In Figures 12 and 13 there is shown a combination camera, enlarger and projector 10a illustrating a modified form of the invention. In the device 10a the focusing lens holder 110 is slidable at the front end of the casing. Rotatably mounted on the casing is a disc 111 formed with a spiral groove 112. Attached to the holder 110 is a rod 114 having a pin 115 at one end received within the groove 112. Attached to the disc 111 and rotatable therewith is a wheel 116 located on the outside casing. The rod 114 is mounted for horizontal sliding movement in fixed sleeves 120. As wheel 116 is rotated said rod 114 will slidably shift the lens carrier 110 to change the focus. The wheel 116 may be marked with graduations 121 to indicate the number of feet to which the camera is focused.

It will be noted that the wheel 116 may be rotated by the thumb of the hand holding the camera whereby the entire camera may be operated with one hand and the graduations or markings 121 on the wheel may be readily read while the camera is held up to the eye when focusing the camera on the object to be photographed. The readings on the wheel 116 may hence be made without turning the camera.

Pivoted at its lower end on a bracket 122 fixed to the inner surface of bottom wall 20 of the housing, is a shutter holder 123 extending upwardly in the position shown in Figure 12 of the drawings. Within the holder 123 is a shutter mechanism of usual construction adapted to be operated upon depressing pin 126 on some part of the shutter mechanism. Pivoted to the casing 12 is a trigger member 127 having an offset arm 138 located within the casing and engaging the pin 126. Spring 127a on the casing returns the trigger to normal position. When the trigger is pulled, the shutter mechanism is operated.

When the camera is used as an enlarger or projector the holder 123 may be swung downwardly on its pivot to the dot-dash position shown in Figure 12.

Means is provided to vary the size of the shutter opening. To this end there is pivoted to the top wall 19 a pair of parallel downwardly extending discs 128 and 129 having apertures 128a and 129a of various sizes. Said discs carry handles 128b and 129b located on the outside of the casing. When both discs are swung downwardly to vertical position the shutter opening is limited by the smaller aperture 128a in the disc 128.

The disc 128 may be swung upwardly however, to the dot-dash position shown in Figure 12 so that the shutter opening is limited by the aperture 129a in the disc 129. If desired, both of the discs 128 and 129 may be swung upwardly against the underside of the top wall 19 whereby to obtain a full shutter opening of the shutter plate within the shutter holder 123.

If desired, the aperture discs 128 and 129 may be replaced by filters which cut down the amount of light passing through the film and these filters may be similarly mounted on hinges and movable against the underside of the top wall of the camera where they will not be in the path of the light rays.

Having thus described our invention, we claim as new and desire to secure by Letters Patent:

1. In a camera, a casing, shutter mechanism therein comprising a pivoted, apertured shutter plate, a pivoted shutter operating arm connected to said plate by a torsion spring, a member mounted in said casing for up and down sliding movement and having a pin and slot connection with said arm, said member having a pair of spaced fingers, a mirror pivoted within said casing and adapted to engage one finger when swung in one direction to move said member upwardly, and to engage the other finger to move said member downwardly, spring means to move said mirror in one direction, and a handle on the outside of said casing and fixed to said mirror for swinging said mirror in an opposite direction.

2. A camera comprising a casing having a top wall formed with an opening, a lens within said opening, a mirror hinged to the upper side of said top wall, forwardly of said opening and adapted to be swung upwardly about said hinge, a second mirror hinged to the inner side of said top wall, rearwardly of said opening and adapted to be swung downwardly about its hinge, said camera having a front wall formed with an opening, shutter mechanism within said camera and adjacent said front wall, a pair of film rollers rotatably mounted within said camera rearwardly of said opening in the top wall, whereby when said second mirror is swung downwardly it is disposed between the shutter mechanism and the portion of the film between said rollers, spring means normally urging said second mirror to swing upwardly against the underside of the top wall of said camera, and trigger means adapted to releasably retain said second mirror in downwardly and forwardly inclined position.

3. A camera comprising a casing having a top wall formed with an opening, a lens within said opening, a mirror hinged to the upper side of said top wall, forwardly of said opening and adapted to be swung upwardly about said hinge, a second mirror hinged to the inner side of said top wall, rearwardly of said opening and adapted to be swung downwardly about its hinge, said camera having a front wall formed with an opening, shutter mechanism within said camera and adjacent said front wall, a pair of film rollers rotatably mounted within said camera rearwardly of said opening in the top wall whereby when said second mirror is swung downwardly it is disposed between the shutter mechanism and the portion of the film between said rollers, spring means normally urging said second mirror to swing upwardly against the underside of the top wall of said camera, trigger means adapted to releasably retain said second mirror in downwardly and forwardly inclined position, and means controlled by said mirror for operating said shutter mechanism.

4. A camera comprising a casing having a top wall formed with an opening, a lens within said opening, a mirror hinged to the upper side of said top wall, forwardly of said opening and adapted to be swung upwardly about said hinge, a second mirror hinged to the inner side of said top wall, rearwardly of said opening and adapted to be swung downwardly about its hinge, said camera having a front wall formed with an opening, shutter mechanism within said camera and adjacent said front wall, a pair of film rollers rotatably mounted within said camera rearwardly of said opening in the top wall whereby when said second mirror is swung downwardly it is disposed between the shutter mechanism and the portion of the film between said rollers, spring means normally urging said second mirror to swing upwardly against the underside of the top wall of said camera, trigger means adapted to releasably retain said second mirror in downwardly and forwardly inclined position, means controlled by said mirror for operating the shutter mechanism, a focusing lens within said camera and means located adjacent said trigger to shift said focusing lens toward or away from said shutter mechanism.

5. A camera comprising a casing having a top wall formed with an opening, a lens within said opening, a mirror hinged to the inner side of said wall rearwardly of said opening and adapted to be swung downwardly about its hinge, said camera having a front wall formed with an opening, shutter mechanism within said camera adjacent said front wall, a pair of film rollers rotatably mounted within said camera rearwardly of said opening in the top wall whereby when said mirror is swung downwardly it is disposed between the shutter mechanism and said rollers, spring means normally urging said mirror to swing upwardly against the underside of the top wall of said camera, trigger means adapted to releasably retain said mirror in downwardly and forwardly inclined position, means controlled by said mirror for operating the shutter mechanism, a focusing lens within said camera, means located adjacent said trigger to shift said focusing lens toward or away from said shutter mechanism, and means for retaining the shutter mechanism in open position.

6. In a device of the class described, in combination, a housing comprising two generally cylindrical portions substantially at right angles to one another, a light source located near one end of one of said cylinders, a mirror arranged near the intersection of said cylinders and adapted to direct light from said light source to the second cylinder, a condenser lens arranged in said second cylinder adjacent said mirror, a focusing lens at the other end of said second cylinder adapted to focus light from said condenser lens upon a projection screen or the like, means adjacent said condenser lens for supporting a film to be projected, and a shutter means adjacent said focusing lens whereby when film is placed in said position adjacent said condenser lens, said focusing lens may be utilized as the objective lens of the camera.

7. In a device of the class described, in combination, a housing, means in said housing to support film to be exposed, an aperture in said housing to permit light rays to pass to the film, a shutter mechanism movable to a position to prevent the passage of light to the film, a pivoted mirror normally in the path of light, means for urging said mirror to position out of the path of light, trigger means to hold said mirror in normal position, and means operated by said mirror as it completes its movememnt from normal position to cause said shutter mechanism to thereafter move to position to prevent the passage of light to the film.

8. In a device of the class described, in combination, a housing, means in said housing to support film to be exposed, an aperture in said housing to permit light rays to pass to the film, a shutter movable to a position to prevent the passage of light to the film, a pivoted mirror normally in the path of light to the film, a viewing screen against which the light rays are directed by said mirror, means for urging said mirror to position out of the path of light, trigger means to hold said mirror in normal position, and means operated by said mirror as it completes its movement from normal position to cause said shutter to thereafter move to position to prevent the passage of light to the film, said mirror in its operated position lying against said viewing screen to prevent light entering said housing therethrough.

9. In a device of the class described, in combination, a housing, means in said housing to support film to be exposed, an aperture in said housing to permit light rays to pass to the film, a shutter mechanism movable to a position to prevent the passage of light to the film, a pivoted mirror normally in the path of light, means for urging said mirror to position out of the path of light, trigger means to hold said mirror in normal position, and means operated by said mirror as it completes its movement from normal position to cause said shutter mechanismm to thereafter move to position to prevent the passage of light to the film, said mirror and shutter mechanism acting as a focal plane shutter, the leading edge of the slit of which is the mirror and the trailing edge the shutter mechanism.

CHARLES LANGBERG.
GEORGI A. FFOULKES.